(12) United States Patent
Hanisch et al.

(10) Patent No.: US 12,018,350 B2
(45) Date of Patent: Jun. 25, 2024

(54) METHOD FOR RECYCLING LITHIUM BATTERIES

(71) Applicant: DUSENFELD GMBH, Wendeburg (DE)

(72) Inventors: Christian Hanisch, Braunschweig (DE); Tobias Elwert, Clausthal-Zellerfeld (DE); Lisa Brückner, Clausthal-Zellerfeld (DE)

(73) Assignee: DUSENFELD GMBH, Wendeburg (DE)

( * ) Notice: Subject to any disclaimer, the term of this patent is extended or adjusted under 35 U.S.C. 154(b) by 886 days.

(21) Appl. No.: 16/966,114

(22) PCT Filed: Jan. 29, 2019

(86) PCT No.: PCT/EP2019/052122
§ 371 (c)(1),
(2) Date: Jul. 30, 2020

(87) PCT Pub. No.: WO2019/149698
PCT Pub. Date: Aug. 8, 2019

(65) Prior Publication Data
US 2021/0032721 A1   Feb. 4, 2021

(30) Foreign Application Priority Data

Jan. 30, 2018   (DE) .................. 10 2018 102 026.0
Apr. 30, 2018   (EP) ..................................... 18170117

(51) Int. Cl.
*C22B 7/00*   (2006.01)
*C22B 1/00*   (2006.01)
(Continued)

(52) U.S. Cl.
CPC .............. *C22B 7/007* (2013.01); *C22B 1/005* (2013.01); *C22B 3/08* (2013.01); *C22B 3/26* (2021.05);
(Continued)

(58) Field of Classification Search
CPC .. C22B 1/00; C22B 1/005; C22B 3/00; C22B 3/04; C22B 3/06; C22B 3/08; C22B 3/26;
(Continued)

(56) References Cited

U.S. PATENT DOCUMENTS 5,723,097 A    3/1998  Barnett et al.
5,858,061 A *  1/1999  Kleinsorgen ............ C22B 3/402
                                                        429/49
(Continued)

FOREIGN PATENT DOCUMENTS

CN    101519726 A    9/2009
CN    103943911 A    7/2014
(Continued)

OTHER PUBLICATIONS

Meshram et al: "Extraction of lithium from primary and secondary sources by pre-treatment, leaching and separation: A comprehensive review", Hydrometallugry, vol. 150, pp. 192-208, 2014, filed Jul. 30?
(Continued)

*Primary Examiner* — Vanessa T. Luk
*Assistant Examiner* — Nikolas Takuya Pullen
(74) *Attorney, Agent, or Firm* — WC&F IP

(57) ABSTRACT

The invention relates to a method for recycling used lithium batteries containing the steps: (a) digestion of comminuted material (10), which contains comminuted components of electrodes of lithium batteries, using concentrated sulphuric acid (12) at a digestion temperature ($T_A$) of at least 100° C., in particular at least 140° C., so that waste gas (14) and a
(Continued)

digestion material (16) are produced, (b) discharge of the waste gas (14) and (c) wet chemical extraction of at least one metallic component of the digestion material (16).

14 Claims, 7 Drawing Sheets

(51) Int. Cl.
| | |
|---|---|
| C22B 3/00 | (2006.01) |
| C22B 3/08 | (2006.01) |
| C22B 3/26 | (2006.01) |
| C22B 21/00 | (2006.01) |
| C22B 26/12 | (2006.01) |
| C22B 47/00 | (2006.01) |
| H01M 10/54 | (2006.01) |

(52) U.S. Cl.
CPC ...... *C22B 21/0023* (2013.01); *C22B 23/0407* (2013.01); *C22B 23/0453* (2013.01); *C22B 26/12* (2013.01); *C22B 47/0045* (2013.01); *H01M 10/54* (2013.01); *Y02P 10/20* (2015.11); *Y02W 30/84* (2015.05)

(58) Field of Classification Search
CPC .. C22B 7/00; C22B 7/007; C22B 7/02; C22B 7/20; C22B 7/22; C22B 15/00; C22B 15/0063; C22B 15/0084; C22B 15/0091; C22B 23/00; C22B 23/04; C22B 23/0407; C22B 23/0415; C22B 23/043; C22B 23/0453; C22B 23/0461; C22B 23/0469; C22B 26/00; C22B 26/10; C22B 26/12; C22B 34/00; C22B 34/10; C22B 34/12; C22B 34/1204; C22B 34/1236; C22B 34/124; C22B 34/125; C22B 47/00; C22B 47/0045; H01M 10/54; Y02P 10/20; Y02W 30/84

See application file for complete search history.

(56) References Cited

U.S. PATENT DOCUMENTS

| | | | |
|---|---|---|---|
| 7,192,564 B2* | 3/2007 | Cardarelli | ............... H01M 6/52 75/693 |
| 7,282,187 B1 | 10/2007 | Brown et al. | |
| 2004/0028585 A1 | 2/2004 | Cardarelli et al. | |
| 2007/0079500 A1* | 4/2007 | Silverman | ......... H01M 10/0436 29/623.5 |
| 2007/0196725 A1 | 8/2007 | Tedjar et al. | |
| 2013/0206607 A1 | 8/2013 | Kojima | |
| 2015/0013499 A1* | 1/2015 | Asano | ................... H01M 10/54 75/739 |
| 2017/0077564 A1 | 3/2017 | Yan et al. | |
| 2019/0024212 A1 | 1/2019 | Lien | |
| 2021/0032721 A1 | 2/2021 | Hanisch et al. | |

FOREIGN PATENT DOCUMENTS

| | | |
|---|---|---|
| CN | 105838895 A * | 8/2016 |
| CN | 106505270 A | 3/2017 |
| CN | 103943911 A | 4/2017 |
| CN | 106755967 A | 5/2017 |
| CN | 107267759 A | 10/2017 |
| CN | 10735254 A | 11/2017 |
| CN | 109775731 A | 5/2019 |
| CN | 111655875 A | 9/2020 |
| CN | 115621596 A | 1/2023 |
| DE | 3622105 A1 | 1/1988 |
| DE | 102015207843 A1 | 11/2016 |
| EP | 0077331 A1 | 4/1983 |
| JP | 2000507308 A | 3/1997 |
| JP | 2000-507308 A | 6/2000 |
| JP | 2003157913 A | 5/2003 |
| JP | 2016191134 A | 11/2006 |
| JP | 2007323868 A | 12/2007 |
| JP | 2012074247 A | 4/2012 |
| JP | 7161272 B2 | 10/2022 |
| KR | 1020060101683 A | 9/2006 |
| KR | 1020150002147 A | 1/2015 |
| WO | 2005101564 A1 | 4/2005 |
| WO | 2012/145829 A1 | 11/2012 |
| WO | 2019018333 A1 | 1/2019 |

OTHER PUBLICATIONS

Nayl et al: "Acid leaching of mixed spent Li-ion batteries", Arabian Journal of Chemistry, vol. 10, pp. S3632-S3639, 2017.

Xiaowu et al: "Leaching of Valuable Metals from Calcined Spent Lithium-ion Batteries", The Chinese Journal of Process Engineering, vol. 11, No. 2, Apr. 2011.

Li, J. et al., "Environmentally friendly oxygen-free roasting/wet magnetic separation technology for in situ recycling cobalt, lithium carbonate and graphite from spent LiCoO2/graphite lithium batteries", Journal of Hazardous Materials 302, 2016.

* cited by examiner

METHOD FOR RECYCLING LITHIUM BATTERIES

The invention relates to a method for recycling lithium batteries. According to a second aspect, the invention relates to a recycling installation for processing lithium batteries.

Lithium batteries are batteries in which the electrical energy is stored by way of an electrochemical reaction that is based on lithium. Lithium batteries are used for a broad scope of purposes. The recycling of lithium batteries is still problematic. It is not yet possible to recycle the graphite contained in electrodes to such a quality that it can be reused for the production of lithium batteries. The recovery of lithium also raises problems. Furthermore, the recovery of cobalt, nickel and manganese, which may be present in lithium batteries, is generally only possible to a certain quality, such that the use thereof in new lithium batteries renders it economically impossible. When considered in its entirety, the material recycling efficiency of known recycling methods in terms of the battery cell is lower then 50% by weight.

US 2004/0028 585 A1 describes a method for recovering vanadium from lithium-metal-polymer batteries. According to one variation, this involves the mixing of the comminuted material with 30 percent, diluted sulphuric acid. The vanadium is then obtained in the form of vanadium pentoxide from the resulting aqueous solution. Such a method is thus only practical if the vanadium content in the comminuted material is sufficiently high. However, this is not the case in, for instance, commonly used lithium ions batteries. Moreover, other metallic components, such as cobalt, nickel and manganese, can only be extracted with considerable difficulty. For numerous reasons, including safety reasons, it is regarded as not advisable to use concentrated sulphuric acid.

US 2017/0077564 A1 describes a method for recycling lithium ion batteries in which the comminuted material is leached with diluted sulphuric acid and an aqueous hydrogen peroxide solution. The disadvantage of such a method is that it is very complex to achieve the highest recovery rates.

The article entitled "Acid leaching of mixed spent Li-ion batteries" by Nayl et al, Arabian Journal of Chemistry, 2017, 10, S3632-S3639 also describes a leaching method for lithium batteries, in which diluted sulphuric acid and hydrogen peroxide are used. It has been found that the degree of leaching initially increases with an increasing concentration of sulphuric acid and then declines from 3 M. The highest examined concentration is 4 M.

The invention aims to improve the recovery of lithium batteries.

The invention solves the problem by way of a method for recycling lithium batteries containing the steps (a) digestion of comminuted material, which contains comminuted components of electrodes of lithium batteries, using concentrated sulphuric acid at a digestion temperature of at least 100° C., preferably at least 120° C., especially preferably at least 140° C., so that waste gas and a digestion material are produced, (b) discharging of the waste gas and (c) the wet chemical extraction of at least one metallic component of the digestion material, especially of at least one metallic component (preferably two, three, four or more metallic components) from the list containing cobalt, lithium, manganese, nickel and titanium.

According to a second aspect, the invention solves the problem by way of a recycling installation for processing lithium batteries, especially used lithium batteries, with (a) a reactor for digesting comminuted material, which contains comminuted components of electrodes of the lithium batteries, with concentrated sulphuric acid at a digestion temperature of at least 50° C., (b) a sulphuric acid supply device for adding sulphuric acid to the comminuted material and (c) a discharge device, which is arranged to discharge waste gas out of the reactor. In particular, the discharge device is designed in such a way that it is hydrogen fluoride-proof. In other words, hydrogen fluoride cannot escape into the surrounding environment.

The advantage of the invention is that any fluoride that may be present in the comminuted material can be completely removed during the digestion of the comminuted material using sulphuric acid, said sulphuric acid preferably being concentrated. Fluorine compounds can form hydrogen fluoride, which is extremely problematic from an occupational safety perspective. Hydrogen fluoride is also highly corrosive. By digesting the comminuted material with sulphuric acid, the fluoride is removed from the comminuted material, so that the subsequent steps in the process can be executed in consideration of fewer safety precautions and with a lower degree of material wear. Some separation methods (such as membrane separation methods, bipolar membrane electrodialysis) cannot be conducted in fluids with high fluoride levels; however, such a preparation would enable this. Furthermore, impurities caused by fluorine substances cannot occur, such that the other components of the comminuted material can generally be recovered with a high degree of purity.

It is also advantageous that the battery graphite can often be recovered with such a high degree of purity that it can be used for the production of new electrodes.

It is also practical that the method can generally be conducted in such a way that the lithium is recovered to a sufficiently high degree of purity that it is suitable for the production of new lithium batteries. Insofar as they are present in the comminuted material, cobalt, nickel, manganese and/or titanium can also be recovered to a high degree of purity, thereby rendering them suitable for reuse in a battery.

It is especially advantageous that a recycling efficiency of over 50% by weight in terms of a battery cell can be achieved in most cases.

It should be noted that the specified advantages may occur, but it is not essential that they do.

Known methods focus on the recovery of cobalt and nickel, as these represent the highest material value in used lithium batteries. It is accepted that other components in used lithium batteries, such as the graphite and/or the lithium, cannot be recovered. The recovery of fluoride is also not a priority of known methods, as its resale value is relatively low.

It is particularly beneficial that the method according to the invention can, in most cases, be designed in such a way that, in comparison to pyrometallurgical methods, it requires less energy. In particular, according to preferred embodiment, the method does not comprise a pyrometallurgical step.

From DE 10 2015 207 843 A1, it is known to be advantageous to dry the batteries at a low temperature following comminution, so as to prevent the formation of fluoro-organic substances. During this drying, the organic carbonates that are present in the electrolytes are removed. Therefore, the fluorine compounds remain in the comminuted material. According to a preferred embodiment, the digestion is executed on comminuted material that contains at least one fluorine compound.

Within the scope of the present description, a method for recycling lithium batteries should be understood especially to mean a method during which metallic components of the lithium batteries are recovered. In this sense, the method according to the invention is also a method for extracting metallic components from lithium batteries. The metallic components are, for example, lithium and/or transition metals, especially metals from the sixth, seventh and eighth groups. The transition metals are preferably manganese and/or cobalt and/or nickel. It is also practical if copper and/or titanium are recovered.

Within the scope of the present description, a lithium battery should be to understood particularly to mean a rechargeable battery whose electrochemical reaction involves lithium and/or lithium ions and/or a lithium compound. A battery contains at least galvanic elements.

Preferably, the lithium batteries are at least partially lithium ion batteries. It is especially preferable if the comminuted material contains at least 40% by weight, especially 60% by weight, of lithium ion batteries. Lithium ion batteries contain fluid electrolytes that contain fluoride: said electrolytes render the recycling of the lithium batteries considerably more difficult.

The fluoride content in the comminuted material is preferably lower than 7% by weight, in particular lower than 5% by weight.

The fluoride content in the comminuted material is preferably at least 0.5% by weight, in particular at least 1% by weight.

A recycling installation should be understood especially to mean a device, by means of which 1, 2, 3 or more metallic components of lithium batteries is/are separated from other components of the lithium battery, such that further processing is possible.

When temperatures are specified in the following description, they always refer to the average temperature in the corresponding object. For example, digestion at a digestion temperature of at least 50° C. should be understood especially to mean that the temperature of the comminuted material that is mixed with the sulphuric acid is on average 50° C. It is irrelevant that locally higher or lower temperatures may exist. If no explicit reference is made to a temperature, the corresponding step in the process is preferably conducted at room temperature and ambient pressure of the surrounding atmosphere.

A digestion is to be understood particularly to mean that no diluted sulphuric acid is used. In particular, at at least one point during the reaction, the concentration of the sulphuric acid is above 90%, especially 95%, especially preferably 98%.

Specifically, the digestion is conducted in such a way that fluoride is removed in the form of hydrogen fluoride. In particular, the digestion is conducted such that fluorine components in the comminuted material migrate into the waste gas in the form of hydrogen fluoride. In other words, there is so little water present in the mix of comminuted material and sulphuric acid that a concentration of water-soluble fluoride is less than 100 milligrams per kilogramme of digested material, especially less than 10 milligrams per kilogramme of digested material.

The feature that the comminuted material is digested by means of concentrated sulphuric acid should be understood especially to mean that, in a time interval during the execution of the method, the concentration of the sulphuric acid is so high that the concentration of water-soluble fluoride per kilogramme of digested material stated above is reached. Preferably, the concentration of the sulphuric acid during the execution of the method is at least 95%, preferably at least 98%. Unlike in cases when non-concentrated sulphuric acid is used, the use of concentrated sulphuric acid means that the digested material contains barely any fluoride.

Specifically, a digestion is not a leaching, as leaching is always conducted with an aqueous fluid.

In particular, the digestion material is solid. Unlike methods which do not use concentrated sulphuric acid, the reaction products, i.e. especially the metallic sulphates, cannot dissolve in water and remain as solid matter.

Comminuted material is to be understood particularly to mean a material that results from the comminution of lithium batteries or at least a component of lithium batteries, especially electrodes, and where applicable from a post-processing, for example drying. In this way, the comminution may be followed by several separation steps to separate comminuted metallic foils, plastic foils or cell envelope components and module components. It is practical if the comminuted material contains at most 10% by weight, preferably at most 5% by weight, of plastics and/or metallic impurities. The comminuted material may contain powdery components of electrodes from lithium batteries. In a more general form, non-comminuted material, especially electrode material, can be used instead of the comminuted material. However, it is beneficial for this electrode material to be comminuted.

Specifically, the comminuted material can be a material that has not been subjected to any pyrometallurgical treatment, particularly calcination and combustion. However, it would also be possible and included in the invention for the comminuted material to not have been subjected to any pyrometallurgical treatment.

The discharge of the waste gas is to be understood especially to mean that the waste gas is at least largely directed away from the point of digestion. It is possible that the waste gas is suctioned away. The waste gas generally contains a fluorine compound, particularly hydrogen fluoride. It is possible, but not necessary, that the hydrogen fluoride is removed from the waste gas, especially via precipitation, preferably with a calcium compound. It is also possible that the waste gas is added to a chemical process.

The wet chemical extraction should be understood particularly to mean that a substance that is liquid at 1013 hPa and room temperature or is so in the state in which it is added, is added to the digestion material or a substance which comes from the digestion material, which causes the separation of at least one substance that contains a metal or is a metal itself.

The sulphuric acid is preferably at least 90%, especially preferably at least 95%.

However, it is possible that a sulphuric acid with a low concentration is added to the comminuted material. In this case, the digestion temperature is preferably at least the temperature that is required to evaporate enough water from the sulphuric acid to ensure that that it has a concentration of at least 90%, especially at least 95%. References to percentages generally refer to percent by weight.

The digestion of the comminuted material preferably comprises the step of mixing the comminuted material with the sulphuric acid. The mixing may comprise a spraying with sulphuric acid and/or forced action mixing, for example an extrusion, kneading or agitation.

The digestion temperature is preferably lower than the boiling point of the sulphuric acid to prevent an evaporation of the sulphuric acid. Thus, the digestion temperature is preferably lower than 335° C. Preferably, the digestion temperature is lower than a binder digestion temperature of a binder by means of which the active material is bound to its carrier. Alternatively, the digestion temperature can be higher than the binder digestion temperature. This prevents the binder from contaminating the graphite. However, it should be noted that it is possible, but not necessary, for the comminuted material to contain an appropriate binder. Temperatures between 150° C. and 250° C. are especially favourable.

The digestion can be conducted—like the other steps in the method—under shielding gas, such as nitrogen or argon, to prevent the oxidation of graphite. It is possible, but not necessary, for other steps in the method to also be conducted under shielding gas.

The digestion can—like the other steps in the method—be conducted discontinuously or continuously.

According to a preferred embodiment, the digestion material contains a maximum of 15% water, especially less than 10% water, preferably less than 5%. If barely any water or no water at all is present, fluoride is removed in the form of hydrogen fluoride, so that scarcely any or no fluoride compounds at all remain.

The digestion is preferably conducted until a hydrogen fluoride concentration in the waste gas is below 0.83 mg per cubic metre. Preferably, the hydrogen fluoride concentration is below the traceability threshold. The traceability threshold refers in particular to an infrared-spectrometric measurement. This ensures that significant quantities of hydrogen fluoride cannot be given off in the subsequent steps in the process.

Alternatively or additionally, the digestion is conducted until a fluoride concentration $c_F$ of water-soluble fluoride in the digestion material is lower than 100 milligrams per kilogramme of digestion material, preferably lower than 10 mg/kg and especially preferably below the traceability threshold.

Preferably, the sulphuric acid is added to the comminuted material at least stoichiometrically, but preferably over-stoichiometrically. This should be understood particularly to mean that enough sulphuric acid is added to render it possible to extract all non-precious metals and copper in the comminuted material and, according to a preferred embodiment, to extract them in a subsequent step in the method. Specifically, enough sulphuric acid is added to ensure that all non-precious metals and copper in the comminuted material dissolve by at least 99% by weight. It should be noted that, even in the case of an over-stoichiometric addition of sulphuric acid, due to the finite nature of the reaction speed and the adjusting chemical balance, metal residues may remain that did not react with the sulphuric acid.

Preferably, the concentrated sulphuric acid is used at a weight ratio to the weight of the comminuted material of at most 40 to 1, especially at most 20 to 1, preferably at most 10 to 1. In other words, a maximum of 40 kilogrammes of concentrated sulphuric acid is added per kilogramme of comminuted material.

For instance, it is beneficial if at least 1.8 grams $H_2SO_4$ per gram of cathode material is added, especially 1.8 grams $H_2SO_4$ per gram of electrode active material. In particular, the cathode material is $LiMO_2$, wherein M stands for a transition metal or aluminium. The cathode is the electrode that is positively charged during discharging.

The method preferably comprises the step of separating hydrogen fluoride from the waste gas, especially the precipitation of hydrogen fluoride from the waste gas. This is achieved, for instance, by means of a calcium compound, thereby causing the formation of calcium fluoride.

The method preferably comprises the steps of leaching the digestion material and separating graphite, resulting in a raw fluid. It is favourable if the method comprises the step of separating the powdery components from metal foils and metal and plastic pieces, thereby resulting in a separate powder made of electrode active material.

The leaching is preferably done with an aqueous fluid, especially water.

A weight ratio of digestion material to aqueous fluid is preferably 1:2 to 1:20. The leaching is carried out for at least 1 minute and preferably for a maximum of 10 hours. The separation is preferably a filtering. However, it is also possible that the graphite is centrifuged or separated in another manner. The digestion with sulphuric acid generally results in the concentration of metal, especially metal ions, in the graphite being so low that the graphite is suitable for use as electrode graphite for producing new lithium batteries or other batteries.

It is possible that the method comprises the step of cleaning the separated graphite, which can be achieved with water or a diluted mineral acid, for example.

The cleaning is preferably so intensive that <10 mg/kg of metal ions are present in the wash water. It has been proven that, in known methods, the crystalline structure of graphite can be so severely damaged that it cannot be used as electrode graphite. Due to the fact that, according to a preferred embodiment of the method, no wet chemical or thermal oxidation occurs prior to the separation of the graphite, the crystalline structure of the graphite is damaged so little that it can often be reused in batteries.

During leaching, the pH value is preferably between −0.7 and 4. The leaching is preferably conducted at room temperature; however, this is not essential.

Preferably, the method comprises the step of separating copper from the raw fluid, thereby producing de-copperised raw fluid. It is possible, but not necessary, that the separation of the copper is the wet chemical process that occurs immediately after the leaching. In particular, it is also possible that other metals are separated before the separation of copper. Specifically, this refers to a selective copper separation. A temperature during the separation of the copper is preferably between 0° C. and 100° C. The separation is preferably carried out over 1 minute to 720 minutes.

The separation may be a cementation. In the case of cementation, an electrochemical reaction of the copper ions takes place, causing the formation of elementary copper. For example, the cementation is carried out with a ferrous substrate.

Alternatively, the separation comprises a precipitation. For instance, the copper can be precipitated as copper sulphide. To this end, the raw fluid is fed into a precipitating substance, such as a *sulphurous* substance. This may refer to sodium hydrogen sulphide. In this case, copper sulphide precipitates, especially CuS. It is favourable if the precipitating substance is added over-stoichiometrically, so that a concentration of copper ions in the de-copperised raw fluid is preferably lower then 10 mg per litre, especially preferably lower than 1 mg per litre.

The method preferably comprises the step of oxidising iron ions and the precipitation of iron. Specifically, $Fe^{2+}$ ions in the de-copperised raw fluid are oxidised to form $Fe^{3+}$ ions. This may be achieved with an oxidising agent, such as an oxygen compound. The oxygen compound may be hydrogen peroxide or ozone, for example.

The precipitation of iron preferably occurs as hydroxide. The precipitation results in a pure fluid.

It is especially favourable if aluminium is precipitated, preferably in the form of a hydroxide. It is also beneficial if existing titanium is precipitated, preferably in the form of titanium oxide.

The precipitation of iron and/or aluminium and/or titanium preferably occurs due to the addition of NaOH, $Na_2CO_3$, KOH, MgO or ammonium hydroxide.

It should be noted that the term pure fluid should only indicate that metals which are seen as an impurity, such as iron and, where applicable, copper, aluminium and titanium, have been removed. Specifically, the term pure fluid is not intended to give any indication of the concentration of other substances.

The feature that an oxygen compound is used for oxidation should be understood to mean that oxygen changes its oxidation number during the redox reaction. Alternatively, a compound can be used as an oxidising agent, for example, which contains oxygen but which does not change its oxidation number during the redox reaction.

Oxidation is preferably conducted until the electrochemical potential is between 0.8 and 1.4 Volt in relation to the normal hydrogen electrode. The redaction $Fe^{2+} \rightleftharpoons Fe^{3+}+e^-$ occurs in this voltage range.

Preferably, the pH value during oxidation is at most 8.7. During precipitation, the pH value is preferably at least 4.3, especially preferably 4.8. In particular, the pH value during precipitation is at most 8.7, preferably at most 7.8. As a result, iron and/or aluminium and/or titanium are largely precipitated.

The method preferably comprises a solvent extraction of cobalt. It is preferably extracted from the pure fluid. It is especially beneficial to use a cobalt complexing agent for this, such as a complexing agent that is dissolved in a lipophilic fluid. The lipophilic fluid may be, for example, a mineral oil, such as kerosene. One possibility is to use a phosphinic acid, such as Cyanex 272 (bis(2,4,4 trimethylpentyl)phosphinic acid).

The method preferably comprises the subsequent step of a solvent extraction of nickel. This is preferably done using a nickel complexing agent. It is beneficial if the solvent is extracted from the pure fluid. The complexing agent is preferably dissolved in a lipophilic fluid, such as a mineral oil like kerosene.

It is practical for cobalt and nickel to be extracted from the pure fluid in a combined extraction process, so that a cobalt and nickel-enriched fluid is obtained.

Preferably, manganese is removed from this fluid in a subsequent extraction step, especially through solvent extraction, preferably by means of a manganese complexing agent.

Cyanex 301 (Bis(2,4,4-trimethylpentyl)dithiophosphinic acid), for instance, is well-suited for the extraction of nickel or cobalt, wherein the Cyanex can be used having been dissolved in kerosene beforehand. Nickel can be re-extracted from the charged organic phase by means of hydrochloric acid or sulphuric acid, for example, and then crystallised in the form of nickel chloride or nickel sulphate. Cobalt can also be re-extracted from the charged organic phase using hydrochloric acid and/or sulphuric acid, for example, and then crystallised in the form of cobalt chloride or cobalt sulphate. In addition, manganese can be re-extracted from the charged organic phase using hydrochloric acid and/or sulphuric acid and subsequently crystallised in the form of manganese chloride or manganese sulphate. Alternatively, manganese can be precipitated, for instance in the form of carbonate.

The removal of cobalt, nickel and/or manganese results in a target fluid. Preferably, lithium is precipitated from the target fluid. This may occur, for instance, by adding a phosphate, such as sodium phosphate, or a carbonate, such as sodium carbonate. The precipitation of lithium preferably occurs at pH 7 to 14.

If the pure fluid contains neither cobalt nor nickel nor manganese, lithium is preferably precipitated from the pure fluid (28). This is the case if, for instance, the comminuted material is produced using only lithium iron phosphate batteries.

Preferably, the comminuted material contains powdery electrode material from lithium ion batteries. Comminuted electrode foils, separator foils, other foils, the cell envelope materials and components of the battery module periphery are separated from the comminuted lithium ion batteries, resulting in powdery electrode active material.

The comminuted material is preferably obtained by comminuting batteries and subsequently deactivating the resulting raw comminuted material through drying. It is especially beneficial if the comminution occurs in an inert gas atmosphere and/or under a vacuum. If comminution occurs under a vacuum, a pressure is preferably at most 300 hPa. Preferably, a temperature is a maximum of 100° C., preferably a maximum of 80° C. This prevents the formation of fluoro-organic substances. The fluoride remains in the comminuted material and is removed via digestion with sulphuric acid, as described above.

According to a preferred embodiment, the deactivation is followed by the separation of comminuted metallic current collector foils, separator foils of the cell envelope components and the module components, thereby resulting in the comminuted material.

The batteries are preferably pre-discharged and/or obtained by dismantling battery systems or battery modules.

In the case of a recycling installation according to the invention, the reactor is preferably a rotary kiln or a heated forced action mixer. This ensures a thorough mixing of sulphuric acid with the comminuted material. The reactor features, for instance, a temperature control or regulator, by means of which the temperature of the mixture of comminuted material and sulphuric acid is brought to the digestion temperature and maintained at this temperature. It is also possible that the digestion occurs discontinuously, for example in a chamber furnace.

According to a preferred embodiment, the recycling installation comprises a leaching device for leaching the digestion material in an aqueous medium.

The recycling installation preferably has a fluoride separator for separating the hydrogen fluoride. For example, the hydrogen fluoride may be precipitated. However, it is also possible that the hydrogen fluoride is diverted to a reaction with another substance, such as an organic substance.

It is favourable if the recycling installation is designed to be mobile. In other words, it is possible to move the recycling installation without having to dismantle it. The recycling installation is preferably arranged in a 20 foot container or a 40 foot container.

The transport of comminuted material is often associated with risks, as it contains flammable substances and fluorine compounds. Therefore, there is a risk, possibly an acceptably small risk, that a release of hydrogen fluoride will cause a fire. It is thus practical for the electrolyte, cell components, electrode foils and electrode powder to be separated locally. It is therefore advantageous if the recycling installation comprises a battery processing installation for comminuting lithium batteries, as described in DE 10 201 5 207 843 A1. It is then possible, but not necessary, for the reactor, the one sulphuric acid supply device and the one discharge device, as well as any other devices specified in the claims, to be designed to be mobile and preferably arranged together in a 20 foot container or a 40 foot container.

The recycling installation preferably comprises a graphite recovery device, which features a graphite separation device, especially a filter, for separating graphite and is arranged behind the reactor in a direction of material flow.

According to a preferred embodiment, the graphite recovery device comprises a wash-out device for washing out adherent leaching solution from the graphite. This wash-out device is preferably designed to wash out the leaching solution with an aqueous fluid.

The recycling installation preferably has a fluoride detector for detecting fluorine compounds, especially hydrogen fluoride. The fluoride detector is preferably a hydrogen fluoride analyser for measuring a hydrogen fluoride concentration in the waste gas.

According to a preferred embodiment, the recycling installation features a control unit, which is connected to the fluoride detector and designed to automatically control the reactor, such that it maintains the digestion temperature until the fluoride concentration, especially the hydrogen fluoride concentration, in the waste gas falls below a predetermined threshold value.

According to a preferred embodiment, the recycling installation has a precipitation material separator for separating, especially filtering out, precipitated Cu or Cu compounds.

It is favourable if the recycling installation has a solvent extraction device for extracting cobalt, manganese and/or nickel, which is arranged behind the graphite recovery device in the direction of material flow.

The recycling installation preferably also has a Fe/Al/Ti precipitation material separator for separating, especially filtering out, precipitated iron and/or aluminium and/or titanium compounds. The Fe/Al/Ti precipitation material separator is preferably arranged behind the rotary kiln and in front of a solvent extraction device, if available, in the direction of material flow.

Preferably, the maximum temperature to which the comminuted material or digestion material is subjected is 1000° C., preferably at most 700° C., particularly less than 335° C. The comminuted material has preferably not undergone a decrepitation treatment.

A recycling installation according to the invention preferably features a comminution unit for comminuting the lithium batteries, resulting in shredded material. The recycling installation preferably also features a deactivation device for deactivating the shredded material. It is beneficial if the deactivation device comprises a drying device, which is configured to dry the shredded material until an electrolyte content of the comminuted material is so low that an electrochemical reaction is impossible.

The recycling installation preferably has a vacuum installation that is connected to the drying device for the purpose of generating a vacuum in the drying device.

It is practical if the vacuum device is designed to generate a vacuum of at least 300 hPa. In other words, the vacuum installation is designed in such a way that a pressure of 300 hPa or less is reached. To ensure a low degree of instrument complexity, the vacuum installation is preferably constructed in such a way that the maximum possible pressure is greater than 0.01 Pa, preferably greater than 1 Pa.

The recycling installation preferably has a cemented carbide separation device for separating cemented carbide from the comminuted material. A cemented carbide separation device should be understood particularly to mean a device for separating fragments of peripheral components of the battery system, the battery cell and/or and the electrical contacts of the lithium battery. For example, the cemented carbide separation device has a magnet separation device and/or a separator, in particular a cross-flow separator and/or a zigzag separator.

Alternatively or additionally, the recycling installation preferably has a light fraction separation device for separating a light fraction that comprises, for example, the separator foil and coating material. The light fraction separation device preferably has a zigzag separator and/or an air separator, wherein it is favourable if the air in the light fraction separation device is conducted within a circuit. This reduces the exposure of the environment to dust. The air separator may be an air jet sieve.

It is favourable if the recycling installation has a separation device, especially a classification device, for separating active material from the carrier, in particular by means of air jet sieving and/or a second comminution stage such that an active material fraction and a carrier fraction occur. In particular, the carrier fraction comprises aluminium and copper foil.

It is possible, but not essential, for the recycling installation to have a filling device for filling a transport container with the comminuted material. By means of this transport container, the comminuted material can be transported over longer distances if necessary, for example at least 1 km. The comminuted material can then be directed out of the transport container and into the reactor.

Alternatively, it is possible that the recycling installation does not have a filling device for filling a transport container with the comminuted material. In this case, the comminuted material is preferably transported following comminution to the reactor by means of a continuous or discontinuous conveyor and introduced into the reactor.

In the following, the invention will be explained in more detail by way of the attached figures. They show:

FIG. 1 a flow diagram of a method according to the invention and

FIG. 2 a schematic view of a recycling installation according to the invention,

FIG. 3 a flow diagram for a method according to the invention for processing comminuted material that is free of cobalt, nickel and manganese, FIG. 4 the flow diagram of a method for processing comminuted material that is free of cobalt and nickel but contains manganese, and FIG. 5 a flow diagram of a method according to the invention for comminuted material that is free of manganese and nickel but contains cobalt.

FIG. 6 a flow diagram for the processing of comminuted material that is free of manganese but contains cobalt and nickel.

FIG. 7 a schematic view of a comminution unit of a recycling installation according to the invention.

FIG. 1 shows a flow diagram of a method according to the invention. First of all, the comminuted material, for example in the form of comminuted electrode active material, is provided. This may be achieved, for instance, using a method described in DE 10 2015 207 843 A1. In particular, it is possible that batteries are initially comminuted, thereby resulting in raw comminuted material. In a subsequent step, the raw comminuted material is deactivated via drying, so that deactivated raw comminuted material is obtained.

The deactivation is preferably a drying. The drying occurs, for example, in an inert gas atmosphere or under a vacuum. It is favourable if a pressure is at most 300 hPa and a temperature during drying is at most 80° C. This results in comminuted material 10 that can no longer react electrochemically to a significant degree, as the proportion of low boilers in the electrolyte is too low.

According to a preferred embodiment, the deactivation is followed by a separation of the electrode active material from the raw comminuted material. This preferably comprises a combination of mechanical stress, magnetic separation, non-ferrous metal separation, sieving and density separation. It is practical to use air jet sieving, wherein the use of smaller mesh sizes for sieving results in a purer sieved material.

The comminuted material 10 is mixed with sulphuric acid 12. The mixing may be, for instance, an agitation using an agitator. However, it is also possible for the mixing to be a simple addition. In particular, this is possible if the comminuted material 10 is in a reactor in the form of a rotary kiln. In addition, it is possible that the comminuted material and the sulphuric acid are mixed in a reaction container, preferably made of steel. The resulting mixed comminuted material is then added to a reactor, especially a rotary kiln.

The sulphuric acid 12 is preferably at least 95%. The comminuted material 10 and the sulphuric acid 12 are brought up to a digestion temperature $T_A$, for example at least $T_A=140°$ C., especially at least 150° C. Insofar as a pH value can be determined, it is below 1.5 for the mix of comminuted material and sulphuric acid. In general, however, the water content of the mixture is too low to determine the pH value.

The digestion produces waste gas 14, which contains hydrogen fluoride HF in particular. The digestion occurs until a fluorine compound content, particularly a hydrogen fluoride content, in the waste gas 14 is below a predetermined threshold of, for instance, 0.83 mg per cubic metre, as determined in a discontinuous comparative test in a container without a continuous addition of material. This is checked using a fluoride detector 15, which continuously measures a fluoride concentration.

If the digestion occurs in a charging process, the digestion is conducted until the fluorine compound content, especially a hydrogen fluoride content, is below a predetermined threshold of, for example, 0.83 mg per cubic metre.

Alternatively or additionally, the digestion is conducted until a fluoride concentration $c_F$ of water-soluble fluoride in the digestion material is lower than 100 milligrams per kilogramme of digestion material, preferably lower than 10 mg/kg and especially preferably below the traceability threshold. In other words, the retention time of the comminuted material 10 and the sulphuric acid 12 is selected in such a way that the digestion material has a fluoride concentration $c_F$ of water-soluble fluoride that does not exceed the specified values.

In addition, digestion material 16 is obtained that can be deemed, to a good approximation, to be fluoride-free. Water 18 is added to the digestion material 16, thereby leaching it. The leaching may occur in the same container in which the digestion of the comminuted material occurred; however, this is not essential. For instance, it is possible that the digestion material is put in a container that preferably already contains water. The leaching occurs at a pH value of −0.7 to 4 and preferably without an active addition or discharge of heat.

Following leaching, graphite 20 is separated using a graphite separation device 22. In the present case, the graphite separation device 22 is a filter with a pore size of at most 15 micrometres, preferably at most 10 micrometres. It is beneficial if the pore size is at least 0.5 micrometres.

The graphite 20 can be cleaned in a subsequent step in the method, for example with water, an alcohol, an organic solvent or a mineral acid, so that electrode graphite is obtained. Electrode graphite is a graphite that is suitable for the production of electrodes, especially for lithium batteries. This results in a raw fluid 24.

Metallic copper Cu is obtained from the raw fluid 24, for instance via cementation. To this end, metallic iron is brought into contact with the raw fluid 24, for example, so that iron ions dissolve and copper precipitates metallically.

Alternatively, the copper is separated in the form of copper sulphide. This is achieved, for instance, via precipitation by adding sodium hydrogensulphide NaHS. The separation of the copper results in de-copperised raw fluid 26. This has a pH value between 0 and 4, for instance pH 1.

The $Fe^{2+}$ ions in the de-copperised raw fluid 26 are then oxidised to form $Fe^{3+}$ ions. In the present case, this is achieved by adding hydrogen peroxide $H_2O_2$. However, a different oxidising agent can also be used. The pH value of the de-copperised raw fluid is below 4.3 prior to oxidation. This step is preferably conducted without an active heat supply or extraction.

In a subsequent step, iron, aluminium and, where applicable, titanium are precipitated in the form of a hydroxide. To this end, the pH value is increased to a value between 4.3 and 8.7. This is achieved by adding sodium hydroxide and then separating, especially filtering out or centrifuging, the resulting precipitation. In addition to the separated hydroxides, a pure fluid 28 is also obtained. Solvent extraction is used to extract nickel and cobalt from the pure fluid. In the present case, this is achieved using Cyanex 301, which is dissolved in an organic solvent, generally kerosene.

FIG. 1 shows that two solvent extraction steps are nested inside one another. First, cobalt and nickel are extracted using Cyanex 301, which is dissolved in kerosene.

Stripping with acid, especially with hydrochloric acid or sulphuric acid, is used to obtain a solution 30 that contains nickel and cobalt. Following further separation using Cyanex 272, they are crystallised separately.

If a metal, such as manganese, is specifically named, as it is here or generally in the description, this generally refers to the metals in their elementary form and compounds contained in the metal; it generally also includes the metal ions. The statement that manganese, cobalt and nickel are extracted thus also means that manganese, cobalt and nickel ions and any compounds, and especially ions, containing manganese, cobalt and nickel are removed.

The extraction of cobalt and nickel results in a target fluid 32 that contains manganese. The pH value of the target fluid 32 may be between −0.7 and 10.5.

There are (at least) three options for the further processing of the target fluid 32. According to a first option, the manganese in the target fluid 32 that contains manganese is removed by solvent extraction. This may occur, for instance, using D2EHPA dissolved in kerosene.

According to a second and third option, the manganese is removed by precipitation, which may occur, for instance, by adding sodium hydroxide. According to a third option the precipitation may occur by adding sodium carbonate.

The removal of the manganese produces a target fluid 34. The most important component of this fluid is lithium ions. The lithium is precipitated out of the target fluid 34.

This is done, for instance, using sodium carbonate. A favourable temperature is a maximum of 30 Kelvin below the boiling point of the target fluid 34 and preferably above 50° C.

The lithium carbonate may be washed with water at 50-100° C., preferably 80-100° C., and/or ethanol.

It is beneficial if the precipitation step is preceded by a concentration step, thereby increasing the concentration of lithium. Alternatively, the lithium may be precipitated as lithium phosphate; to this end, sodium phosphate can be added, for example.

The concentration may occur, for instance, via reverse osmosis and/or evaporation.

FIG. 2 depicts a schematic view of a recycling installation 36 according to the invention for processing lithium batteries, in the present case in the form of comminuted material 10 produced from lithium batteries. Alternatively, it is also possible that electrode material that does not need to be comminuted is processed in the recycling installation. In the present case, the recycling installation 36 features a reactor 40 in the form of a rotary kiln, in which the comminuted material 10 is digested with sulphuric acid 12. The comminuted material 10 and the sulphuric acid 12 have been previously mixed together in a mixer 42. The mixer 42 is an advantage but not essential. The sulphuric acid 12 is added by means of a sulphuric acid supply device 43, which may refer, for instance, to a dosing device, comprising a sulphuric acid container and a controllable valve. However, it is also possible that the sulphuric acid 12 is poured in from a container.

The recycling installation 36 has a discharge device 44 in the form of a waste gas pipe, which can be connected to a vacuum generator so that the waste gas 14 is sucked out of the reactor 40. Alternatively, it is possible that the excess pressure in the reactor 40 pushes the waste gas 14 through the discharge device 44. The discharge device 44 may feature a washer for washing out hydrogen fluoride. For example, in this washer, the waste gas 14 is brought into contact with a calcium compound, for instance an aqueous solution that contains calcium ions, so that hydrogen fluoride in the waste gas 14 is washed out. Of course, other methods for removing hydrogen fluoride from the waste gas 14 are conceivable. It is also possible that the waste gas 14 is added to a reactor by means of the discharge device 44, in which the hydrogen fluoride reacts, for example, with an organic substance.

The fluoride concentration $c_F$ is identified using a fluoride detector 15.

A leaching device 46 is arranged behind the reactor 40 in the direction of material flow M, wherein the digestion material 16 is leached, for instance with water, in said leaching device.

A graphite recovery device 48 is arranged behind the leaching device 46 in the direction of material flow M, wherein said graphite recovery device only features the graphite separation device 22 in the form of a filter in the present case. An optional wash-out device for washing out adherent leaching solution from the graphite is not depicted. It is also possible to initially fill a transport container with the graphite and to conduct the washing-out of adherent leaching solution following transportation to another location.

A copper extractor 50 is arranged behind the graphite recovery device 48 in the direction M of material flow. According to a first alternative, the copper extractor comprises a container 52 for cementing the copper following the addition of iron, especially in the form of sheet iron or iron filings, as well as a precipitation material separator 54 for separating selected copper compounds. The precipitation material separator 54 may be a filter, for example. The pore size of the filter is preferably smaller than 50 micrometres and at least 1 micrometre.

According to an alternative embodiment, the precipitation material separator is designed to separate copper sulphide and the container 52 is for the reaction of the raw fluid 24 with NaHS, so that copper sulphide precipitates.

An Fe/Al/Ti separator 56 is arranged behind the copper extractor 50 in the direction of the material flow, wherein an oxidising agent 58 is added to the de-copperised raw fluid 26 in said separator. This may occur in a first container 60.1. The resulting solution is then transferred, for example pumped, into a second container 60.2. In this second container 60.2, a hydroxide is added, in particular an alkaline hydroxide. For instance, sodium hydroxide is added. This results in the precipitation of aluminium, iron and, where applicable, titanium in the form of a hydroxide or a hydrated oxide. The precipitation is removed by means of a particle separator 62 arranged downstream in the direction of material flow. The particle separator 62 is formed of a filter, for example, which may have a maximum pore size of 15 micrometres.

The resulting pure fluid 28 is added to a solvent extraction device 64, which features a Co/Ni solvent extraction device 66. This comprises a multitude of reaction containers 38.1, 38.2, . . . , which are connected to one another as shown in FIG. 2. The structure of a solvent extraction device is known from the prior art and will therefore not be explained in further detail. This produces the target fluid 32 containing manganese.

The target fluid 32 is added to a manganese solvent extraction device 70, which generates target fluid 34.

According to an alternative, the target fluid 32 containing manganese is added to a second precipitation reactor 72, in which the manganese is precipitated as manganese hydroxide following the addition of a hydroxide, especially an alkaline hydroxide such as sodium hydroxide.

According to a third alternative, the target fluid 32 containing manganese is added to a precipitation reactor 74. Following the addition of a carbonate, in particular following the addition of sodium carbonate, manganese is precipitated in the form of manganese carbonate or separated.

The lithium is precipitated in respective containers as carbonate by adding sodium carbonate or as phosphate by adding sodium phosphate. It is possible that the recycling installation 36 comprises a concentrator 74 for removing water from the target fluid 34 to facilitate precipitation.

FIG. 3 shows a flow diagram for a method according to the invention for processing comminuted material and/or electrode material that is free of cobalt, nickel and manganese. It should be noted that the method corresponds to the method according to FIG. 1, wherein the steps related to the extraction of cobalt, nickel and manganese have been omitted.

FIG. 4 shows a flow diagram for the processing of comminuted material and/or electrode material that is free of cobalt and nickel but contains manganese. For the extraction of manganese, only the variation with solvent extraction is depicted. The alternatives shown in FIGS. 1 and 2 for the removal of the manganese are also possible for the method according to FIG. 4 and represent preferred embodiments.

Figure 1:
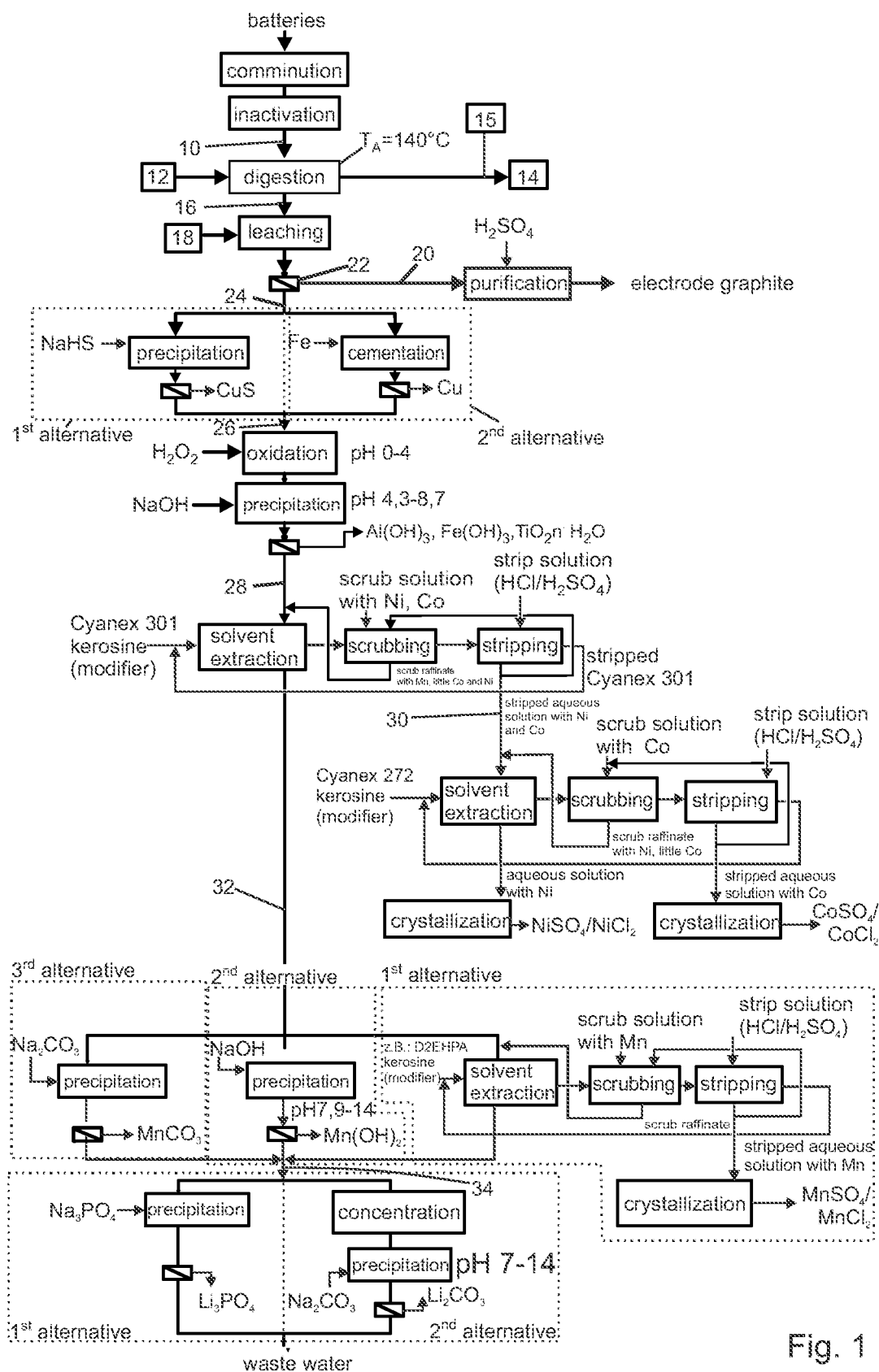
Figure 2:
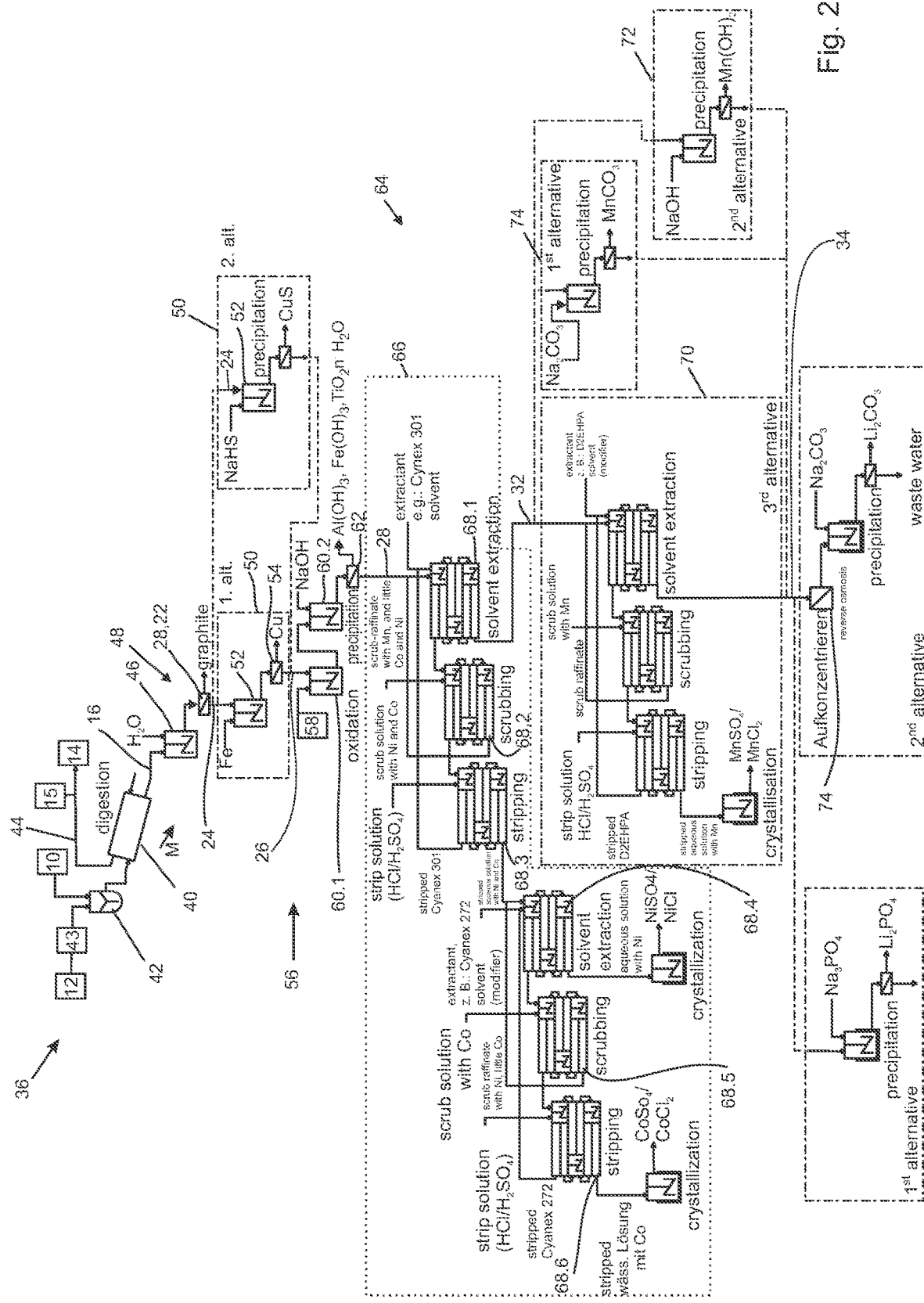
Figure 3:
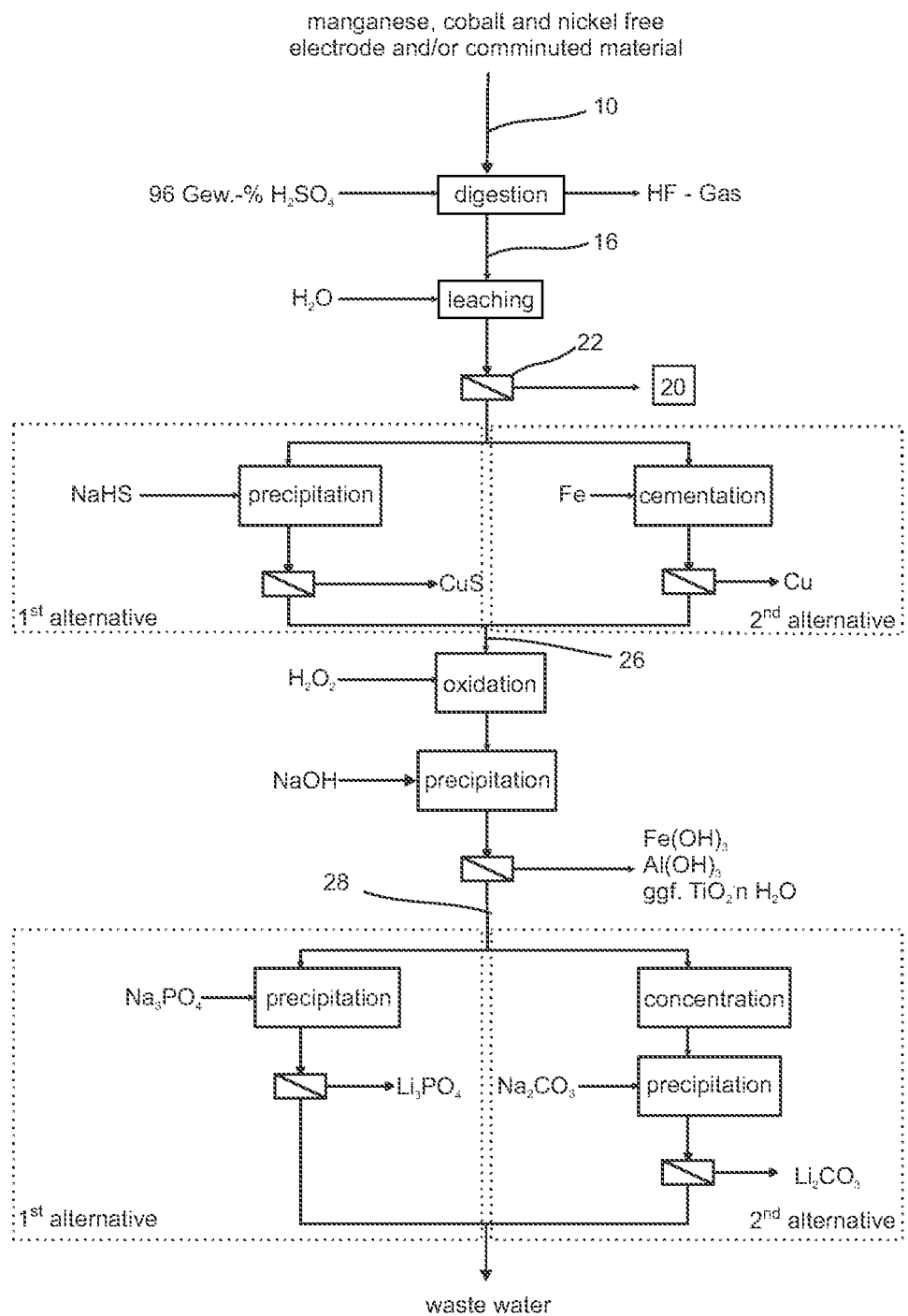
Figure 4:
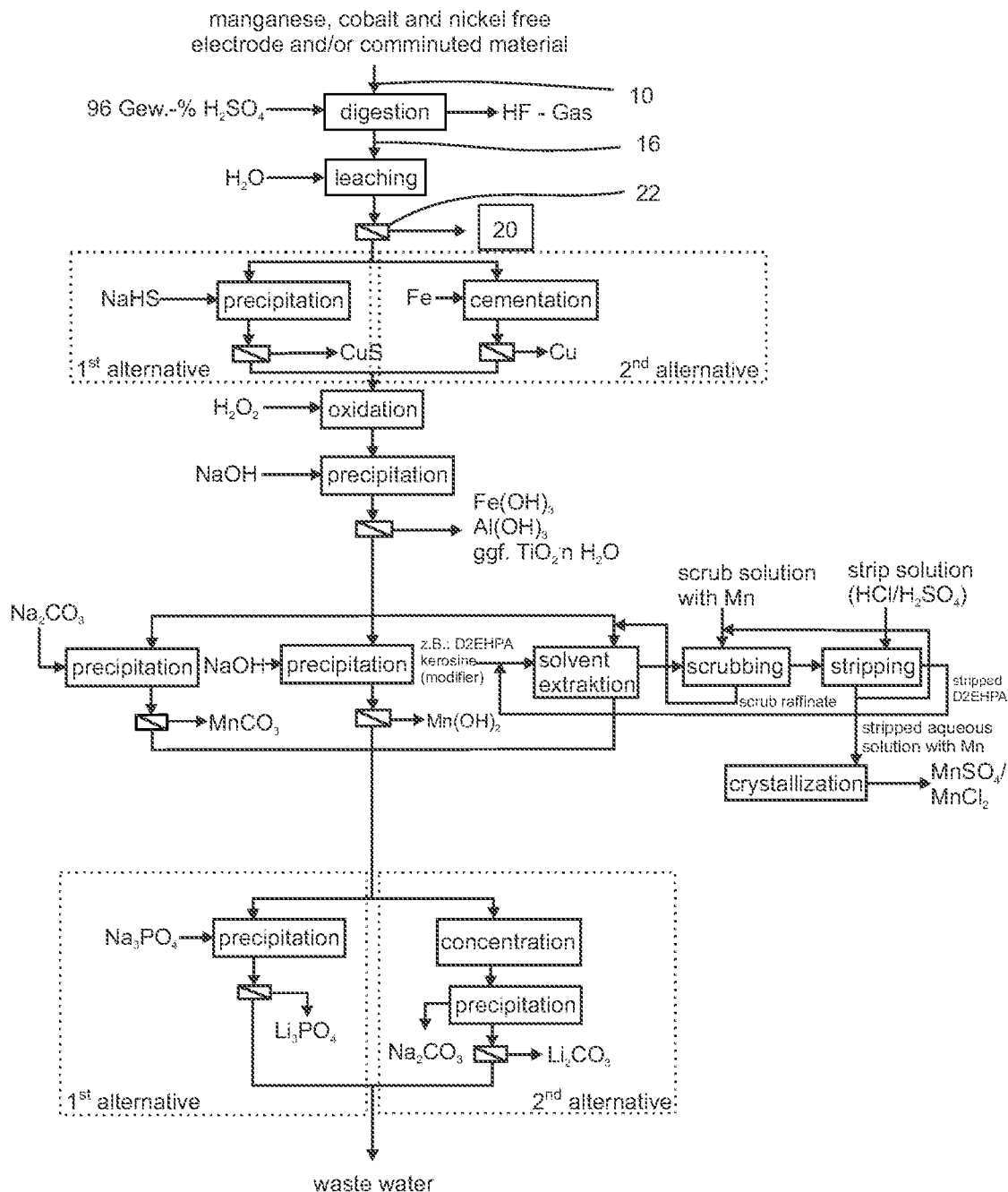
Figure 5:
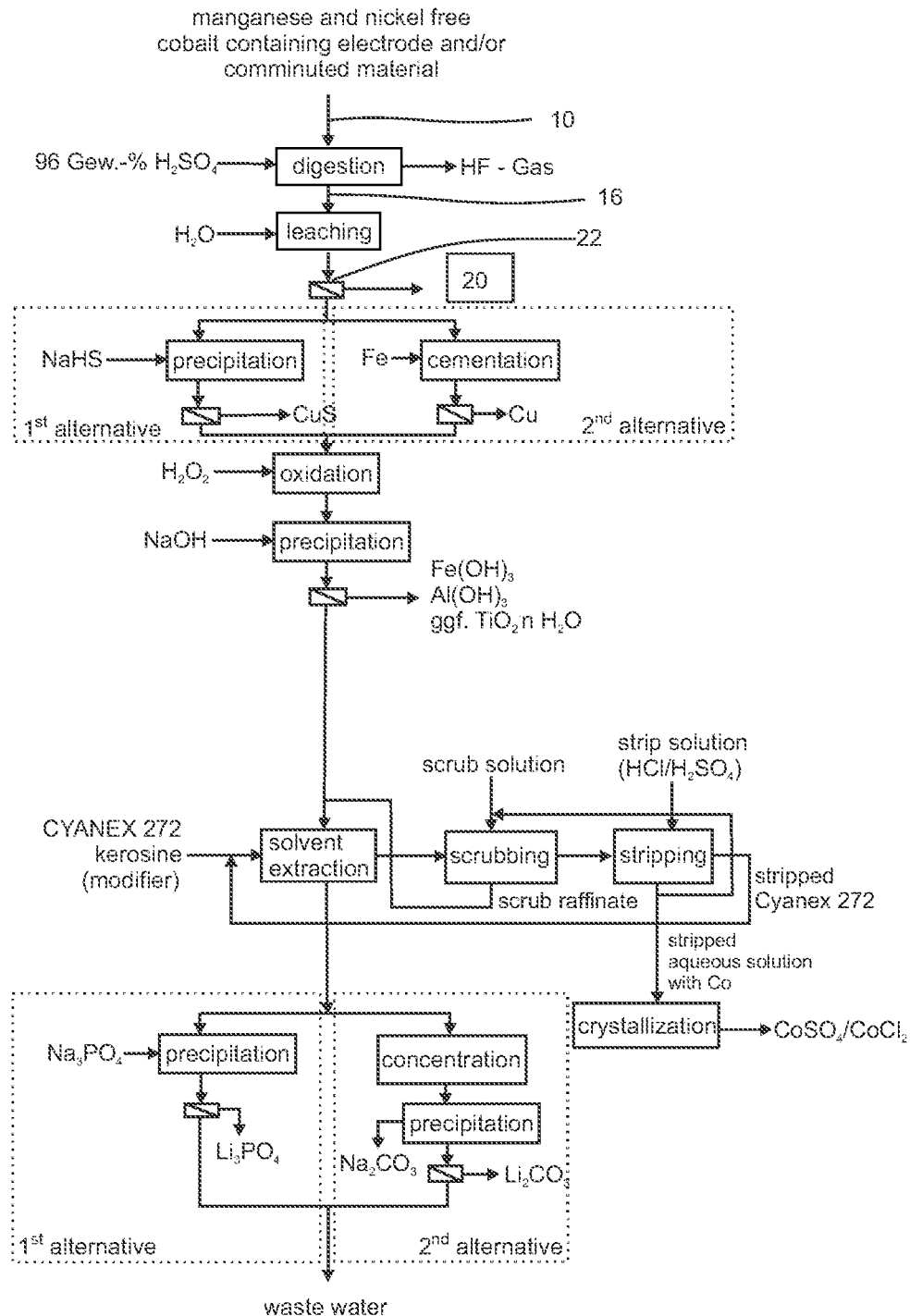
FIG. 5 depicts the flow diagram of a method for processing electrode and/or comminuted material that is free of manganese and nickel but contains cobalt.
Figure 6:
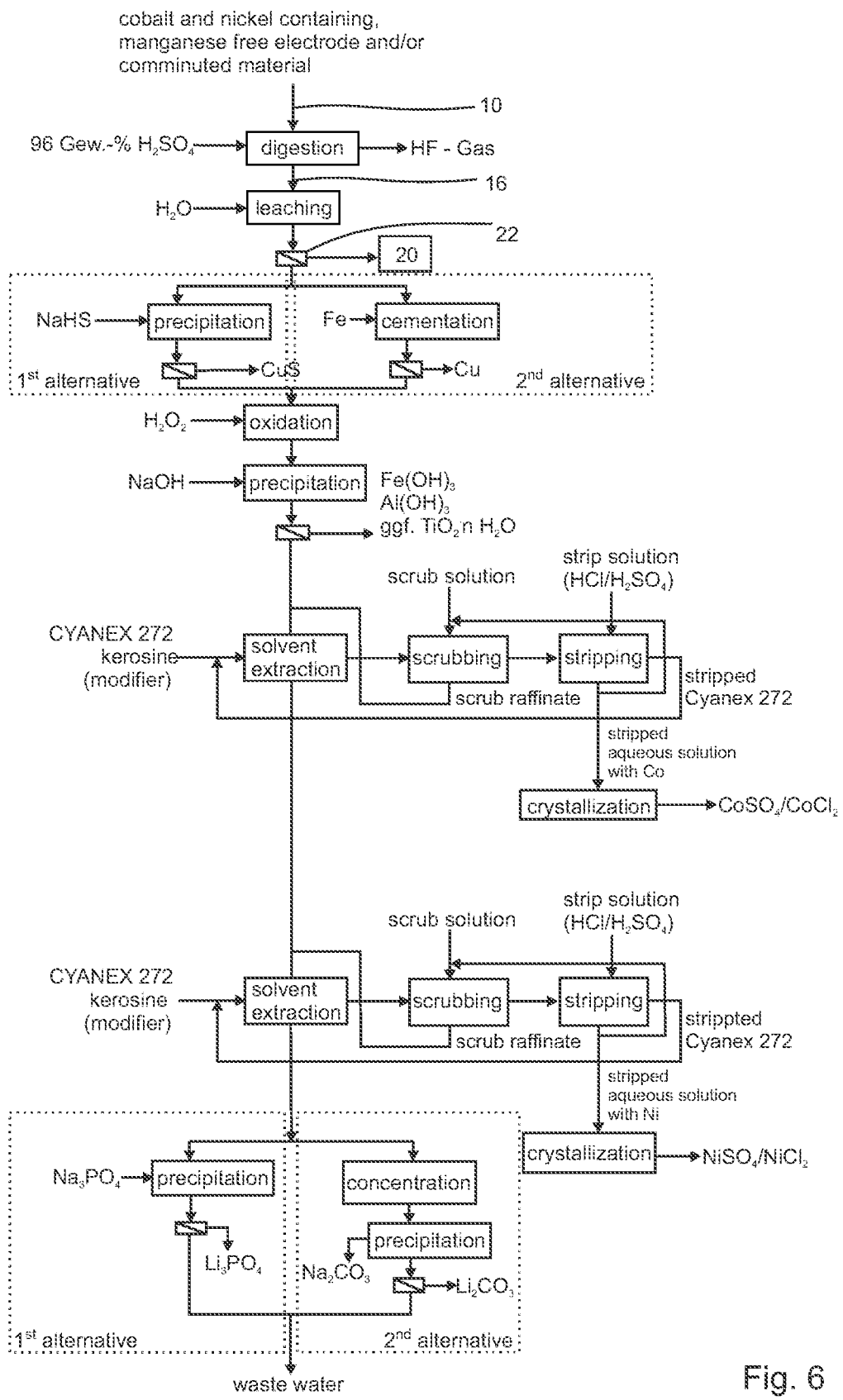
FIG. 6 shows a flow diagram of a method according to the invention for electrode and/or comminuted material that is free of manganese but contains cobalt and nickel.

It should be recognised that the recycling device 36 comprises a comminution unit 118 and a deactivation device 126. The deactivation device 126 is designed as a drying device.

Lithium batteries 110.1, 110.2, ..., in particular battery systems made up of several battery modules or battery stacks, which are in turn made up of several battery cells, are initially discharged in a discharge unit 112. This is followed by the dismantling of the lithium batteries 110 at a dismantling station 114, if this is necessary because the battery systems cannot otherwise be delivered into the comminution unit 118 for geometric or gravimetric reasons. To this end, where appropriate, the battery systems are opened and dismantled to the point at which the modules and/or stacks can be individually removed. If required, the individual lithium battery cells can also be separated from the drive electronics.

The resulting sub-units (modules/stacks) and/or cells 116.1, 116.2, ... are added to the comminution unit 118. For example, the comminution unit 118 may be a rotary shear with at least one rotor and at least one stator. The comminution unit 118 may also comprise a cutting mill with a rotor or several rotors.

The comminution unit 118 comminutes the lithium batteries 110.$i$ under shielding gas 120, which is extracted, for example, from a shielding gas cylinder 122. Alternatively or additionally, liquid nitrogen from a liquid nitrogen source 119 may be may be injected. The shielding gas may refer, for example, to nitrogen, a noble gas, carbon dioxide, nitrous oxide or another gas which is preferably not toxic.

Shredded material 124 is produced during comminution, which is fed into a deactivation device in the form of a drying device 126. An airlock 128 is arranged between the comminution unit 118 and the drying device 126, the airlock being so gas-tight that the drying device 126 is—to a good approximation—separated from the comminution unit 118 so as to be gas-tight.

The drying device 126 is connected to a vacuum installation 129 that comprises a vacuum pump 130 and creates a vacuum. A pressure $p_{126}$ from $p_{126} \approx 100 \pm 60$ hPa, preferably 50 hPa, is present in the drying device 126. It should be noted that, within the scope of the present description, the vacuum pump should be understood particularly generally to mean a device that creates a vacuum. It is possible and preferred, but not necessary, for the vacuum pump to simultaneously work as a compressor, such that gas is emitted from it under a pressure that is greater than the ambient pressure.

Figure 7:
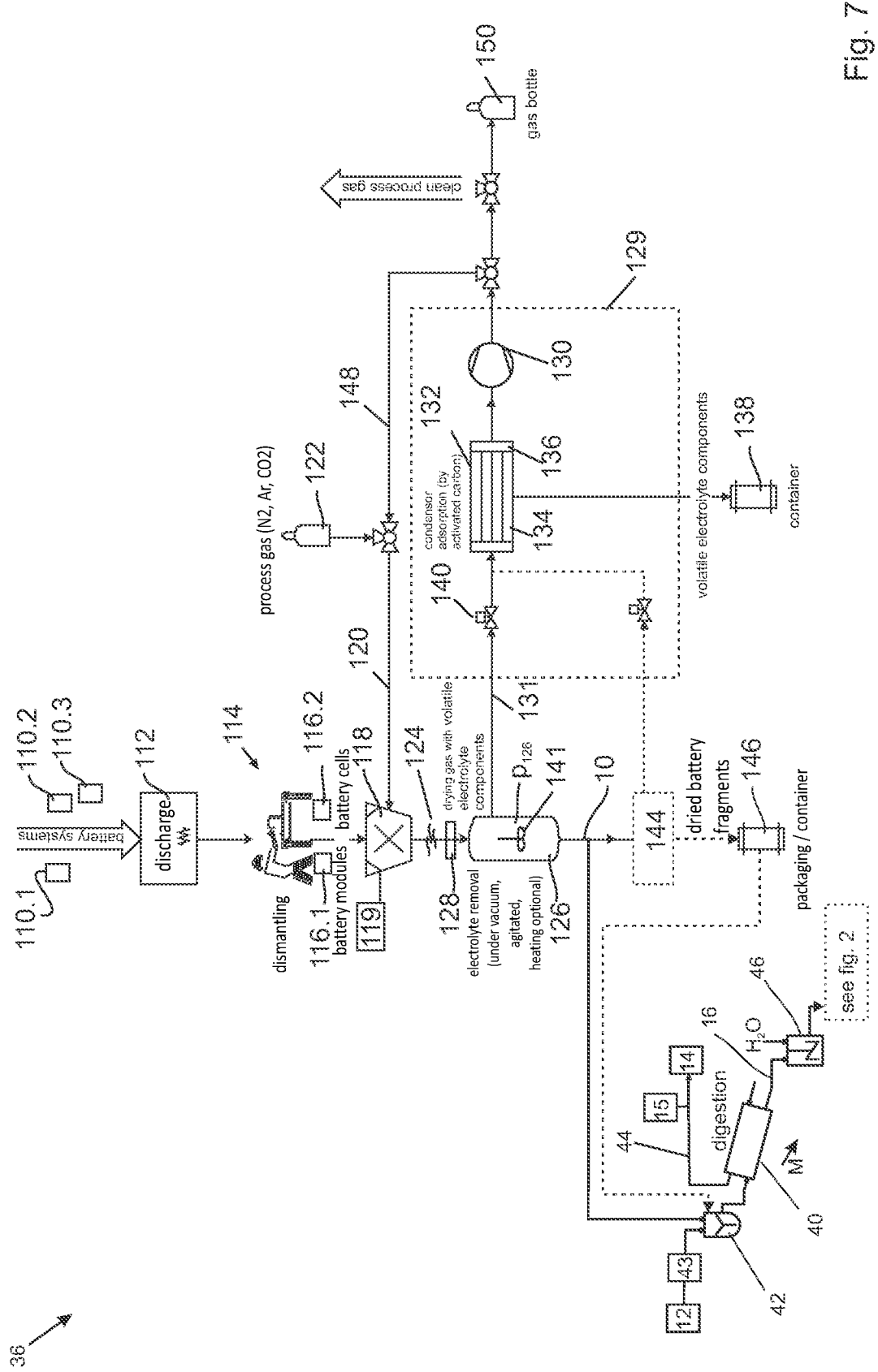
FIG. 7 depicts a second embodiment of a recycling installation 36 according to the invention, wherein the components arranged behind the leaching device 46 in the direction of material flow have been omitted for the sake of clarity.

In the case depicted in FIG. 7, the vacuum pump is a compressor which sucks in and compresses gas 131 that is present in the drying device 126. Alternatively or additionally, the vacuum installation 129 may have a jet pump, wherein a jet medium in the form of a liquid is directed at a high speed through at least one Venturi nozzle. The jet medium is preferably alkaline and has a pH value of at least pH 13 and is, for example, a 10% potassium hydroxide solution.

The vacuum installation 129 comprises a gas purification device 132 that is arranged between the drying device 126 and the vacuum pump 130, and which has a condenser 134 and/or an activated carbon filter 136 in the present case. The condenser is operated at a temperature of, for instance, −10° C. so that dimethyl carbonate and ethyl methyl carbonate condense and can be dispensed into a condensate container 138. In addition, any water present is separated by freezing. A control valve 140 is designed to open if the pressure $p_{26}$ becomes too great and to close if the pressure $p_{126}$ becomes too small, i.e. when a pre-determined threshold value is not reached.

The drying material is preferably moved in the drying device 126. This may be achieved by agitating with an agitator 141, such as an anchor agitator or a rod agitator with, for example, rods arranged perpendicular to the agitator shaft. Alternatively, it can be achieved by way of a drying container that is moved.

The drying of the shredded material 124 results in deactivated comminuted material 10, which is added to the mixer 42.

Alternatively, a transport container 146 is then filled with the deactivated comminuted material 10 under a vacuum and/or shielding gas. The transport container 146 is preferably gas-tight. It is possible, but not necessary, for the transport container 146 to be filled with inert gas prior to transportation such that it is under normal pressure. Alternatively, it is also possible for the transport container to be sealed under vacuum and transported. It is possible that, instead of the transport container, a vacuum-sealed foil is selected, such as an aluminium compound foil.

The comminution unit 118 is fed with shielding gas 120 from the vacuum pump 130 via a flushing line 148. If the vacuum pump 130 also functions as a compressor—as in the present case—which represents a preferred embodiment, the shielding gas 120 can be drawn from a pressurised gas cylinder 150. Alternatively or additionally, the shielding gas 120 can be given off into the surroundings, following additional cleaning if necessary.

| Reference list | |
|---|---|
| 10 | comminuted material |
| 12 | sulphuric acid |
| 14 | waste gas |
| 15 | fluoride detector |
| 16 | digestion material |
| 18 | water |
| 20 | graphite |
| 22 | graphite separation device |
| 24 | raw fluid |
| 26 | de-copperised raw fluid |
| 28 | pure fluid |
| 30 | solution |
| 32 | target fluid containing manganese |
| 34 | target fluid |
| 36 | recycling installation |
| 38 | electrode material |
| 40 | reactor |
| 42 | mixer |
| 43 | sulphuric acid supply device |
| 44 | discharge device |
| 46 | leaching device |
| 48 | graphite recovery device |
| 50 | copper extractor |
| 52 | container |
| 54 | precipitation material separator |
| 56 | Fe/Al/Ti precipitation material separator |
| 58 | oxidising agent |
| 60 | container |
| 62 | particle separator |
| 64 | solvent extraction device |
| 66 | Co/Ni solvent extraction device |
| 68 | reaction container |
| 70 | Mn solvent extraction device |
| 72 | precipitation reactor |
| 74 | concentrator |

| Reference list | |
|---|---|
| 110 | lithium battery |
| 114 | dismantling station |
| 116 | cells |
| 118 | comminution unit |
| 119 | liquid nitrogen source |
| 120 | shielding gas |
| 124 | shredded material |
| 126 | drying device |
| 128 | airlock |
| 129 | vacuum installation |
| 130 | vacuum pump |
| 131 | gas |
| 132 | gas purification device |
| 134 | condenser |
| 136 | activated charcoal filter |
| 138 | condensate container |
| 140 | control valve |
| 141 | agitator |
| 146 | transport container |
| 148 | flushing line |
| 150 | pressurised gas cylinder |
| $c_F$ | fluoride concentration |
| $T_A$ | digestion temperature |
| M | direction of material flow |

The invention claimed is:

1. A method for recycling lithium batteries containing:
digesting comminuted material which contains comminuted components of electrodes of lithium batteries, using concentrated sulphuric acid at a digestion temperature of at least 100° C., so that waste gas and a digestion material are produced, wherein the comminuted material is not pyrometallurgically treated prior to digesting with concentrated sulphuric acid,
discharging of the waste gas, and
performing wet chemical extraction of at least one metallic component of the digestion material,
wherein the communited material contains fluoride components and wherein the digestion is conducted in such a way that the fluoride components in the comminuted material pass into the waste gas as hydrogen fluoride.

2. The method according to claim 1 wherein the digesting is conducted until a concentration of water-soluble fluoride in the digestion material is lower than 100 mg/kg.

3. The method according to claim 1 wherein the concentrated sulphuric acid is utilised at least stoichiometrically during digestion.

4. The method according to claim 1 further comprising separating hydrogen fluoride from the waste gas.

5. The method according to claim 1, wherein the comminuted material contains graphite and wherein the method further comprises:
leaching of the digestion material, and
separating graphite from the digestion material thereby producing a raw fluid.

6. The method according to claim 5, wherein the comminuted material contains copper and wherein the method further comprises separating copper from the raw fluid so that a de-copperised raw fluid is obtained.

7. The method according to claim 6, wherein the de-copperised raw fluid contains $Fe^{2+}$ ions, iron, aluminum, and titanium, and the method further comprises:
oxidizing $Fe^{2+}$ ions in the de-copperised raw fluid to $Fe^{3+}$ ions, and
precipitating iron and/or aluminium and/or titanium, so that a pure fluid is obtained.

8. The method of claim 7 wherein the oxidizing is performed with an oxygen compound.

9. The method according to claim 7, wherein when the pure fluid contains cobalt, nickel and/or manganese, the method further comprises:
solvent extraction of cobalt, and/or
solvent extraction of nickel, and/or
removal of manganese,
so that a target fluid is obtained.

10. The method according to claim 9, further comprising:
precipitating lithium from the target fluid when the pure fluid contains cobalt, nickel and/or manganese, or
precipitating lithium from the pure fluid when the pure fluid contains neither cobalt, nickel nor manganese.

11. The method of claim 9, further comprising using a complexing agent for one or more of cobalt, nickel or manganese.

12. The method according to claim 1, further comprising the following steps prior to digesting:
comminuting batteries such that raw comminuted material is obtained, and
deactivating the raw comminuted material by drying such that the comminuted material is obtained.

13. The method of claim 1 wherein the digesting is performed at at least 140° C.

14. The method of claim 1, wherein the concentration of water soluble fluoride in the digestion material is lower than 10 mg/kg.

* * * * *